United States Patent [19]

Passalenti et al.

[11] 4,272,416

[45] Jun. 9, 1981

[54] FILM-FORMING RESIN FOR USE IN ANTI-CORROSIVE AND CAN-COATING COMPOSITIONS

[75] Inventors: Beppino Passalenti, Lissone; Gino Giuliani, Parabiago; Osvaldo Fiorani, Sesto S. Giovanni, all of Italy

[73] Assignee: Societa Italiana Resine S.I.R. S.p.A., Milan, Italy

[21] Appl. No.: 95,285

[22] Filed: Nov. 19, 1979

[30] Foreign Application Priority Data

Nov. 21, 1978 [IT] Italy ............................ 29966 A/78

[51] Int. Cl.³ ............................................. C08L 91/00
[52] U.S. Cl. ............................ 260/18 EP; 106/14.23; 106/14.24; 106/14.35
[58] Field of Search ................ 106/14.24, 14.22, 9, 106/8, 219, 220, 14.23, 14.35; 260/18 EP, 18 PF, 18 VP; 252/393, 396; 220/454; 148/31.5

[56] References Cited

U.S. PATENT DOCUMENTS

| | | |
|---|---|---|
| 2,485,321 | 10/1949 | Schiermeir ...................... 106/14.22 |
| 2,502,145 | 3/1950 | Greenlee ......................... 260/18 EP |
| 2,921,947 | 1/1960 | Millar et al. ................ 260/18 EP X |
| 2,930,708 | 3/1960 | Chatfield .......................... 106/14.22 |
| 3,003,980 | 10/1961 | Hames et al. ..................... 260/18 PF |
| 3,585,159 | 6/1971 | Mihara et al. ................ 106/14.35 X |
| 3,711,307 | 1/1973 | Mikusch-Buchberg .... 260/18 EP X |

*Primary Examiner*—Ronald H. Smith
*Assistant Examiner*—Thurman K. Page
*Attorney, Agent, or Firm*—Sughrue, Rothwell, Mion, Zinn and Macpeak

[57] ABSTRACT

Resinous substance suitable for use as film-forming component in anti-corrosive and can-coating paint and varnish compositions, which consists of the product obtained by reacting a normally solid polyepoxide with cashew nut oil in such amounts as to ensure equivalence between the phenolic hydroxyl groups of the cashew nut oil and the epoxy groups of the polyepoxide, and modifying the resulting reaction product with fatty acids having at least 8 carbon atoms per molecule, using a molar ratio of from 0.1:1 to 0.8:1 between said fatty acids and the cashew nut oil used in the reaction with the polyepoxide.

13 Claims, No Drawings

FILM-FORMING RESIN FOR USE IN ANTI-CORROSIVE AND CAN-COATING COMPOSITIONS

The present invention relates to a resinous substance particularly suitable for use as a film-forming component in anti-corrosive and can-coating paint and varnish compositions, and to a process for its preparation.

At present anti-corrosive paints based on epoxy or alkyl-phenolic resins, as well as can coating varnishes comprising binary or ternary combinations of epoxy, phenolic and melamine resins, are widely used in the art.

The adherence of these known anti-corrosive paints to metallic surfaces is satisfactory only if these surfaces have previously been freed from rust. It is therefore of interest to provide paints which are capable of adhering to the support and providing adequate resistance to degradation by atmospheric agents, without the need to remove the rust completely and perfectly. Such a paint would in fact allow considerable economy to be achieved, given the saving in time and work in the preparation of the support, and would, for example, make it possible to maintain plants in operation, even in the case of supports of a complex form.

Can coating varnishes known in the art display good resistance on hardening, although they require relatively high temperatures, in general of the order of 200°–250° C., for their application.

It is therefore of interest to provide formulations capable of hardening at lower temperatures and/or in shorter periods of time so as to reduce the size of the ovens used for the purpose and their running costs.

It has now been found that these desirable results may be achieved by using anti-corrosive and can coating paint and varnish compositions which contain a specific resinous substance consisting of the product of the reaction of a polyepoxide with cashew nutshell oil, subsequently modified by reaction with saturated and/or unsaturated fatty acids. This resinous substance can be used as film-forming component in compositions which:

dry in air and display, even on rusted supports, a resistance to corrosion at least equal to that of the traditional compositions based on epoxy and alkylphenolic resins;

when applied to tinned plate, have the peculiar property of requiring hardening temperatures about 50°–60° lower than those required for the traditional compositions, while having the same mechanical characteristics and resistance to various types of food substances.

Thus, the invention provides a resinous substance suitable for use as film-forming component in anti-corrosive and can-coating paint and varnish compositions, which consists of the product obtained by reacting a normally solid polyepoxide with cashew nut oil in such amounts as to ensure equivalence, or substantial equivalence between the phenolic hydroxyl groups of said cashew nut oil and the epoxy groups of said polyepoxide, and modifying the resulting reaction product by reaction with saturated and/or unsaturated fatty acids having at least 8 carbon atoms per molecule, using a molar ratio of from 0.1:1 to 0.8:1 between said fatty acids and the cashew nut oil used in the reaction with the polyepoxide.

The polyepoxides useful for the purpose of the present invention are solid at ambient temperatures and consist of the product of the reaction of a polyhydric phenol with a halohydrin. Particularly useful for the purpose are the products of the reaction of 2, 2-bis(4-hydroxyphenyl) propane (bisphenol-A) with epichlorohydrin which have a molecular weight within the approximate range of from 900 to 1700.

As is known, cashew nut oil is a natural phenol which is extracted from the shells of cashew nuts and consists predominantly of a phenol carrying an aliphatic chain in the ortho or meta position, the chain having from 15 to 17 carbon atoms and conjugated ethylenic unsaturation. Cashew nut oil also contains small quantities of diphenol derivative with the two phenolic hydroxyl groups in the meta position to each other.

According to the present invention, cashew nut oil and the polyepoxide are brought into contact and reacted, generally at a temperature of from 200°–280° C. and preferably from 240°–270° C., by using quantities of the reagents such as to ensure equivalence or near equivalence between the phenolic hydroxyl groups of the cashew nut oil and the epoxy groups of the polyepoxide.

In practice, the reaction is continued under the said temperature conditions until the epoxy groups have almost completely disappeared.

The reaction product thus obtained generally has a viscosity of from U to V, as measured on the Gardner scale at 25° C. in a 55% by weight solution in a solvent mixture formed from white spirit and solvent naphtha in a weight ratio of 80:20.

According to the present invention the reaction product of the polyepoxide with the cashew nut oil, obtained in the manner indicated above, is modified by reaction with saturated or unsaturated fatty acids containing at least 8 atoms of carbon, and preferably from 16 to 18 atoms of carbon per molecule. For this purpose unsaturated fatty acids, such as those from dehydrated castor oil, soyabeans, linseed etc., are preferably used.

In particular, the molar ratio between fatty acid and cashew nut oil fed in initially is from 0.1:1 to 0.8:1, and preferably from about 0.4:1 to about 0.6:1. The reaction is generally carried out at a temperature of from 200° to 280° C., preferably from 230° to 260° C., and until the acid value of the resulting reaction product is equal to or less than 3.

Thus a resinous substance is obtained which is useful for the purposes of the present invention, and which, in general, has a Gardner viscosity of from O to Y measured in the manner indicated above.

The driers for the resinous substance are generally chosen from metal salts of organic acids, particularly the octoates and naphthenates of cobalt, manganese and lead. The amount of drier, evaluated as the metal, is generally from 0.2 to 0.4 parts by weight for every 100 parts by weight of the resinous substance. Clearly, a single metal salt or a mixture of several salts may be used.

In the preparation of the can-coating compositions the resinous substance and the drier are conveniently dissolved in a suitable solvent or in a mixture of solvents until a dry matter content of the order of 30–40% by weight is obtained. Solvents suitable for the purpose are white spirit and solvent naphtha, particularly mixed together. The can-coating varnish compositions of the present invention are applied to tinned plate and hardened at temperatures typically of the order of 200° C. for periods of about 15 minutes.

The anti-corrosive paint compositions include the resinous substance, the drier, and also fillers, pigments and suspending, wetting and anti-skinning agents in a liquid carrier. This latter preferably consists of white spirit and solvent naphtha, especially mixed together. The drier is generally used in amounts of the order of 0.2 to 0.4 parts by weight for every 100 parts by weight of the resinous substance. Moreover a weight ratio of from 1:1 to 1:2 is conveniently maintained between the resinous substance and the sum of the further constituents: filler, pigment and suspending, wetting and anti-skinning agents. The preferred fillers are talc and asbestine, while the preferred pigment is iron oxide.

The wetting agent generally used for the purpose is soya lecithin. The anti-corrosive paint compositions of the present invention generally have a total dry matter content of the order of 55–70% by weight. These compositions dry in air with formation of a film which adheres to the metallic surface even if it is rusted, as will be shown in the following experimental examples.

EXAMPLE 1

A resin is prepared from cashew nut oil, a polyepoxide and fatty acids from dehydrated castor oil. More particularly, cashew nut oil is loaded into a flask provided with an agitator, a system for passing in inert gas and means for controlling the temperature, and the mass is heated to 140° C. An atmosphere of nitrogen is maintained in the flask, while the polyepoxide, consisting of the product of the reaction of bisphenol-A with epichlorhydrin and having a molecular weight of 950, is added in an amount of 0.5 moles for every mole of cashew nut oil. The mass is then heated to 260° C. and is maintained at this temperature until the reaction mixture has a Gardner viscosity of U, measured as shown hereinbefore. The mass is then cooled to 180° C. and fatty acids of dehydrated castor oil are added in an amount of 0.5 moles for every mole of cashew nut oil loaded in initially. The mass is heated to 240° C. and maintained at this temperature until the acid value of the resulting product is equal to or less than 3. The resin thus obtained is dissolved in a solvent mixture of white spirit and solvent naphtha (weight ratio of (80:20) until a concentration of 50% by weight is achieved (Resin A).

EXAMPLE 2

(comparative)

A resin according to the known art is prepared from cashew nut oil, formaldehyde, epoxy resin and linseed oil.

More particularly, a condensation product of cashew nut oil and formaldehyde in a molar ratio of 1:0.6 is prepared in a flask provided with an agitator, a system for passing in an inert gas and means for controlling the temperature.

The formaldehyde is fed in in the form of 96% by weight paraformaldehyde and the condensation is carried out at 90° C. and at a pH of 5 obtained by the addition of sulphuric acid, until the reaction product has a Gardner viscosity of E-F, measured at 25° C. in a 66% by weight solution in xylene. The reaction water is removed by distillation at atmospheric pressure, after the pH of the mass has been brought to a value of 7 by means of the addition of aqueous sodium hydroxide. The polyepoxide, consisting of a reaction product of bisphenol-A with epichlorhydrin, having a molecular weight of 1500, and the linseed oil are then added.

Both the epoxy resin and the linseed oil are used in an amount of 0.1 mole for every mole of cashew nut oil fed in initially. The mass is heated to 220° C. and maintained at this temperature until the Gardner viscosity is K, measured at 25° C. in a 50% by weight solution in a solvent mixture of white spirit/solvent naphtha in a 80:20 weight ratio. At the end of the reaction, the mass is cooled and the resin obtained is dissolved in the solvent mixture mentioned above until a concentration of 50% by weight is obtained (Resin B).

The anti-corrosive primer formulation (a) (Table 1) and the can-coating varnish formulation (c) (Table 2) are prepared from the Resin A of Example 1. Similarly an anit-corrosive primer formulation (b) (Table 1) and a can-coating varnish formulation (d) (Table 2) are prepared from the Resin B of Example 2.

In Table 3 are given the constituents of the can-coating formulation (e) of the known art which includes a ternary mixture of epoxy, phenolic, and melamine resins. In particular, for this latter formulation, there are used the commercial products of the Società Italiana Resine SIR known as:

Eposir 7182—polyepoxide with a molecular weight of about 3700, obtained by reaction of bisphenol-A with epichlorhydrin, in a 60% by weight solution in Cellosolve.

Sirfen 5890—Product of the condensation of xylenol with formaldehyde, in a 56% by weight solution in a mixture of butanol and diacetone alcohol.

Siramin 4141—50% by weight butylated melamine resin, in a solution in butanol.

In the following Tables the parts and percentages are given by weight. In the formulations the following commercial products are used: finely ground talc MT 120 of the Talco Grafite Company, red iron oxide M 81 of the Montedison Company, asbestine 1634 of the Massimiliano Massa Company, Bentone 38 and Eskin 2 of the Urai Company and soya lecithin of the Comiel Company.

Moreover, by drier is meant a toluene solution of metal salts containing cobalt naphthenate (6%), manganese naphthenate (8%) and lead naphthenate (30%).

Finally in the Tables by solvent is meant the white spirit/solvent naphtha mixture in a 50/50 weight ratio.

TABLE 1

| Formulation | (a) | (b) |
|---|---|---|
| Resin A | 44.0 | — |
| Resin B | — | 44.0 |
| Talc MT 120 | 18.8 | 18.8 |
| Iron oxide M 81 | 15.0 | 15.0 |
| Asbestine 1634 | 10.0 | 10.0 |
| Bentone 38 | 0.4 | 0.4 |
| Eskin 2 | 0.2 | 0.2 |
| Soya lecithin | 0.3 | 0.3 |
| Drier | 1.1 | 1.1 |
| Solvent up to a viscosity of 100″ in Ford Cup No. 4 (25° C.) | 10.0 | 10.0 |

TABLE 2

| Formulation | (c) | (d) |
|---|---|---|
| Resin A | 80.0 | — |
| Resin B | — | 80.0 |
| Drier | 2.0 | 2.0 |
| Solvent up to a viscosity of 100″ in Ford Cup No. 4 (25° C.) | 18 | 18 |

TABLE 3

| Formulation | (e) |
| --- | --- |
| Eposir 7182 | 47.0 |
| Sirfen 5890 | 21.0 |
| Siramin 4141 | 2.0 |
| Cellosolve | 5.0 |
| Solvesso | 10.0 |
| Isobutanol | 10.0 |
| Phosphoric acid (85%) | 0.4 |
| Solvent up to a viscosity of 100″ in Ford Cup No. 4 (25° C.) | 4.6 |

The formulation (a) and the formulation (b) are dried in the form of films on sheet metal supports of the UNICHIM 5867 type which have been completely and perfectly cleaned and on similar supports which have rusted.

In Table 4 are given characteristics relative to the drying as well as characteristics of the anti-corrosive primer and, particularly, values relative to the films on the cleaned supports are given under (CS), those relative to the rusted supports are given under (RS). For comparison, there are also given values obtained from commercial formulations of the Società Resine S.I.R. known as:

Eposir 7161 based on an epoxy resin with a polyamine hardener (primer f).

Siralchid 2750 based on an alkylphenolic- resin and containing metal naphthenates as the driers (primer g).

TABLE 4

| Formulation | (a) | | (b) | | (f) | | (g) | |
| --- | --- | --- | --- | --- | --- | --- | --- | --- |
| Support | CS | RS | CS | RS | CS | RS | CS | RS |
| Drying time | | | | | | | | |
| Dust-free (min.) | — | 10 | — | 35 | — | 60 | — | 45 |
| Tack-free (hour) | — | 1¼ | — | 2¼ | — | 5½ | — | 2½ |
| Total (hour) | — | 9 | — | 10 | — | 14 | — | 9 |
| Thickness (micron) | 40 | 45 | 40 | 40 | 40 | 45 | 40 | 40 |
| Adherence (UNI 53151) | 0 | 0 | 0 | 0 | 0 | 0 | 0 | 0 |
| Hardness (sec) (Albert-Koenig) | 60 | 60 | 50 | 52 | 105 | 106 | 56 | 58 |
| Bending 90° | pass | pass | pass | pass | pass | pass | pass | pass |
| 180° | pass | pass | pass | pass | pass | pass | pass | pass |

In Table 5 are given the characteristics of the anti-corrosive formulations of Table 4 after 600 hours of exposure to saline fog.

The symbols used are again those of Table 4.

TABLE 5

| Formulation | (a) | | (b) | | (f) | | (g) | |
| --- | --- | --- | --- | --- | --- | --- | --- | --- |
| Support | CS | RS | CS | RS | CS | RS | CS | RS |
| Adherence (UNI 53151) | 7 | 7/8 | 7 | 7/8 | 6/7 | 6 | 6/7 | 6 |
| Rust Diffusion mm | 0.5 | 0.5 | 0.5 | 0.5 | 0.5 | 0.5 | 0.5 | 0.5 |
| Blistering (ASTM B 117-64) | | | | | | | | |
| cross | no | no | no | no | 6M | 6MD | 6M | 6MD |
| edges | no | no | no | no | no | no | no | no |
| film | no | no | no | no | no | no | no | no |

In Table 6 are given the characteristics of the can coatings obtained by hardening of the formulations (c), (d), (e). More particularly, the formulation (c) and (d) are hardened at 160° C. for a time of 15 minutes and the formulation (e) is hardened at 200° C. for the same period.

The hardening is carried out on sheets of tinned plate of size 10×15 cm and thickness 0.3 mm.

TABLE 6

| Coating | (c) | (d) | (e) |
| --- | --- | --- | --- |
| Hardness (sec) (Albert-Koenig) | 140 | 120 | 150 |
| Impact (kg . cm/cm²) (NFT 30039) direct | 37 | 37 | 37 |
| inverse | 37 | 37 | 37 |
| Bending 90° | pass | pass | pass |
| 180° | pass | pass | pass |
| Adherence (DIN 53151) after the tests: | | | |
| Olive oil (2 hours at 120° C.) | 0 | 0 | 0 |
| Aqueous copper sulphate (10%) (1 hour at 25° C.) | 0 | 0 | 0 |
| Sterilization (2 hours at 120°) | 4 | 4 | 4 |
| Vegetables (1 hour at 120°) | 1 | 0 | 0 |
| Tunny fish and olive oil | 2 | 2 | 2 |

We claim:

1. A resinous substance suitable for use as film-forming component in anti-corrosive and can-coating paint and varnish compositions, which consists of the product obtained by reacting a normally solid polyepoxide with cashew nut oil in such amounts as to ensure equivalence, or substantial equivalence between the phenolic hydroxyl groups of said cashew nut oil and the epoxy groups of said polyepoxide, and modifying the resulting reaction product by reaction with saturated and/or unsaturated fatty acids having at least 8 carbon atoms per molecule, using a molar ratio of from 0.1:1 to 0.8:1 between said fatty acids and the cashew nut oil used for the reaction with the polyepoxide.

2. The resinous substance of claim 1, characterized in that the polyepoxide is the reaction product of bisphenol-A and epichlorohydrin and has a molecular weight of from 900 to 1700.

3. The resinous substance of claim 1, characterized in that the reaction between polyepoxide and cashew nut oil is carried out at a temperature of from 200° to 280° C. and for a period such as to ensure substantially complete reaction of the epoxy groups of the polyepoxide.

4. The resinous substance of claim 1, characterized in that the reaction product of the polyepoxide and the cashew nut oil has a Gardner viscosity of from U to V, as measured at 25° C. in a 55 wt.% solution in a solvent formed from white spirit and solvent naphtha in a 80:20 weight ratio.

5. The resinous substance of claim 1, characterized in that the fatty acids have from 16 to 18 carbon atoms per molecule.

6. The resinous substance of claim 1, characterized in that the fatty acids are selected from the group consisting of the acids deriving from dehydrated castor oil, soya bean oil and linseed oil.

7. The resinous substance of claim 1, characterized in that the said molar ratio between fatty acids and cashew nut oil is from 0.4:1 to 0.6:1.

8. The resinous substance of claim 1, characterized in that the said resulting reaction product is reacted at a temperature of from 200° to 280° C., until the acid value is equal to or less than 3.

9. The resinous substance of claim 1, which has a Gardner viscosity of from O to Y, as measured at 25° C.

in a 55 wt.% solution in a solvent formed from white spirit and solvent naphtha in a 80:20 weight ratio.

10. Anti-corrosive and can-coating paint and varnish composition comprising the resinous substance of claim 1, a drier and a liquid carrier.

11. The composition of claim 10, wherein the drier is selected from the group consisting of cobalt, manganese and lead salts of organic acids.

12. The composition of claim 11, wherein said drier is present in an amount of from 0.2 to 0.4 parts by weight (as metal) for every 100 parts by weight of resinous substance.

13. The composition of claim 10, wherein the liquid carrier is selected from the group consisting of white spirit, solvent naphtha and mixtures of both.

* * * * *